Oct. 9, 1973   J. L. JANNING   3,764,429
METHOD OF FORMING CAVITIES IN A PLASMA DISPLAY PANEL
Filed Aug. 30, 1971   2 Sheets-Sheet 1

Oct. 9, 1973   J. L. JANNING   3,764,429

METHOD OF FORMING CAVITIES IN A PLASMA DISPLAY PANEL

Filed Aug. 30, 1971   2 Sheets-Sheet 2

United States Patent Office 3,764,429
Patented Oct. 9, 1973

3,764,429
METHOD OF FORMING CAVITIES IN A PLASMA DISPLAY PANEL
John L. Janning, Dayton, Ohio, assignor to The National Cash Register Company, Dayton, Ohio
Filed Aug. 30, 1971, Ser. No. 175,878
Int. Cl. B32b 31/26; B44d 1/14; C04b 37/04
U.S. Cl. 156—89                               8 Claims

ABSTRACT OF THE DISCLOSURE

A method of forming cavities in a plasma display panel having front and rear substrates with the cavities formed therebetween. In one embodiment, layers of glass are silk-screened onto one of the substrates, omitting glass from those areas where cavities are to be formed. The number of layers of glass to be silk-screened depends upon the depth of the cavities desired. In another embodiment, the desired cavities are cut out of a glass transfer tape and secured to one of the substrates. Similar tapes having the cut-out portions in registration with one another are secured to one another to obtain the desired cavity depth. After the desired cavity depth is obtained, the substrate with the required number of layers of glass thereon is fired in an oven.

BACKGROUND OF THE INVENTION

This invention relates to a method of forming cavities in a plasma display panel.

Some of the prior-art methods for forming cavities in display devices are shown in the following United States Patents: 3,096,516, Pendleton et al., July 2, 1963; 3,334,269, L'Heureux, Aug. 1, 1967; 3,509,407, Cullis, Jr., Apr. 28, 1970.

One of the prior-art methods of forming cavities in display devices employs a thin rigid layer of glass with cavity holes formed therein, and this layer is sandwiched between two transparent plates. Another of the patents shows the cavities being formed in a relatively thick substrate by chemical etching techniques.

In contrast with the above, applicant's method utilizes a substrate on which successive layers of glass are deposited. Each layer of glass deposited has a hole therein where a cavity is desired. Successive layers of glass are deposited until the desired depth of the cavity is obtained. Applicant's method produces an inexpensive panel and reduces breakage in the fabrication thereof when compared to prior-art techniques. Layers of glass having different qualities are also used in applicant's method to prolong the life of the resulting display panel.

SUMMARY OF THE INVENTION

This invention relates to a method of forming cavities in a plasma display panel having front and rear substrates with the cavities formed therebetween. In applicant's method, layers of glass are deposited on to one of the substrates, omitting glass from those areas where cavities are to be formed. The number of layers of glass to be deposited depends upon the depth of the cavities desired. Certain layers of the glass deposited have special properties which prolong the operating life of the resulting display panel. After the layers of glass forming the cavities have been deposited, the substrate with the layers thereon is fired in an oven. One of the methods of this invention utilizes silk-screening techniques for depositing the layers forming the cavities, and a second embodiment utilizes glass transfer tapes for depositing the layers of glass.

DESCRIPTION OF THE PREFERRED EMBODIMENTS

Figure 1:
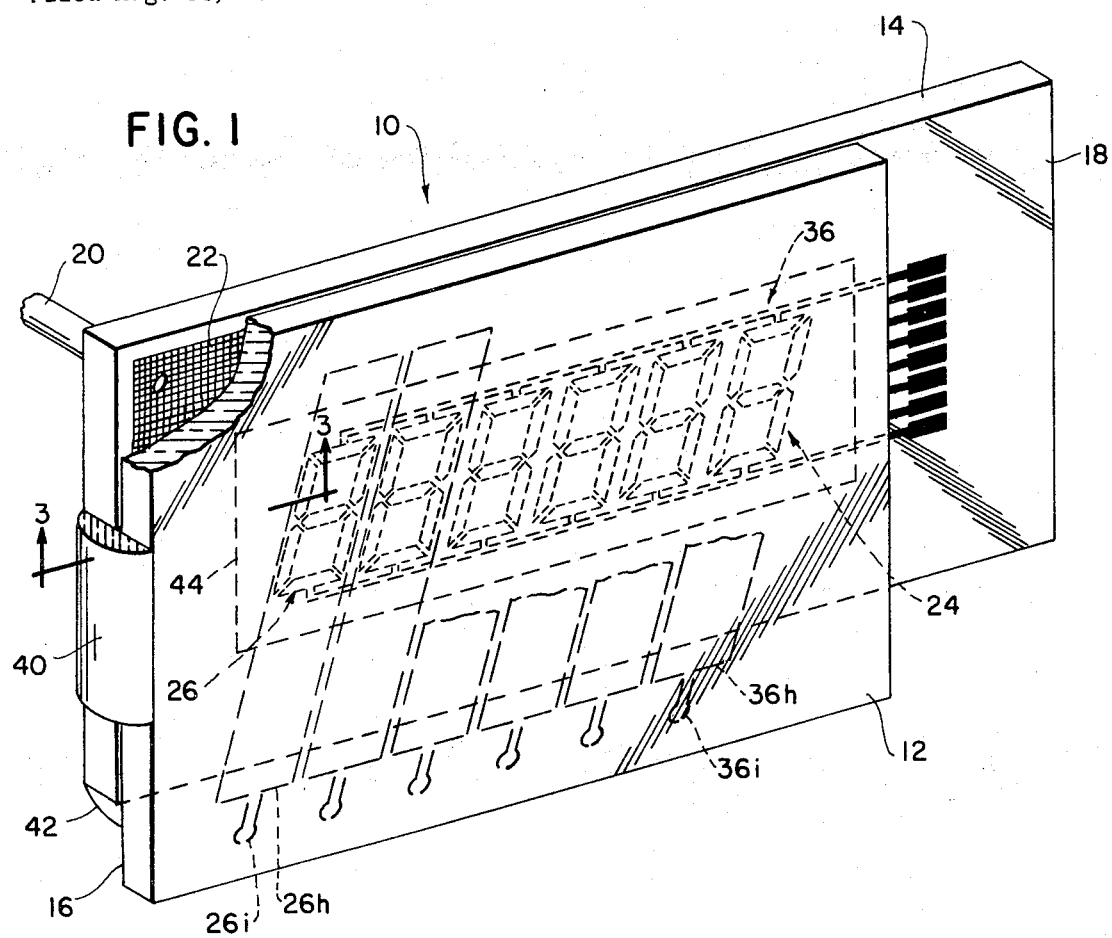
FIG. 1 is a general view, in perspective, of a plasma panel having front and rear substrates and cavities made in accordance with the method of this invention.

FIG. 1 shows a general view, in perspective, of a plasma display panel, designated generally as 10 and made according to the method of this invention.

Figure 2:
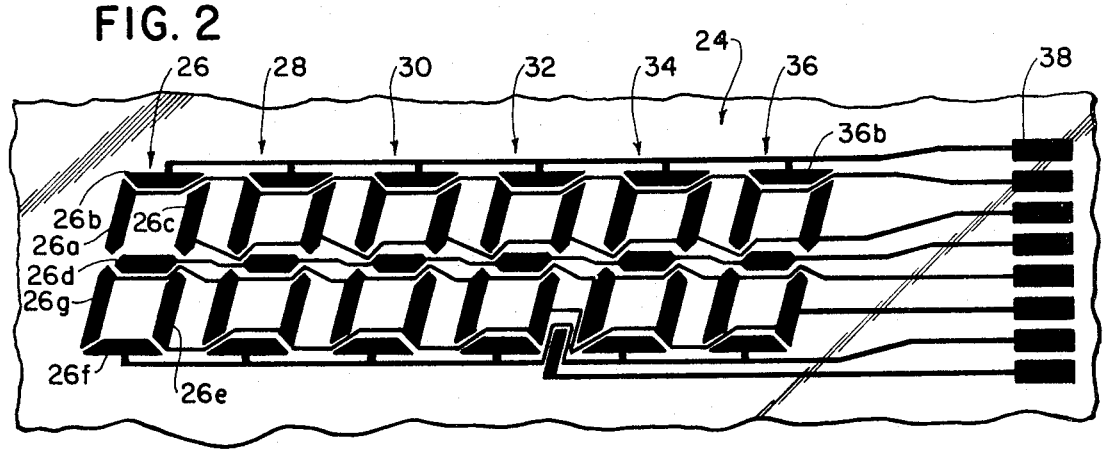
FIG. 2 is a plan view of a portion of the front, or inside, surface of the rear substrate, showing a layout of an electrode pattern thereon.

The display panel 10 (FIG. 1) includes a front plate or substrate 12 and a rear plate or substrate 14 having their inside surfaces 16 and 18 respectively facing each other as shown. The rear substrate 14 has a filling tube 20, which communicates with the interior of the panel 10; the tube 20 is conventionally used for evacuating the air from within the panel and filling it with an ionizable gas. The rear substrate 14 may also have a network of grid-like pressure-equalization grooves 22 to facilitate the flow of gas within the various cavities of the panel 10. The rear substrate 14 has a conductor or electrode pattern, designated generally as 24, formed thereon; the pattern is better shown in FIG. 2.

The conductor pattern 24 (FIG. 2), in the embodiment shown, is capable of displaying six character patterns, 26, 28, 30, 32, 34, and 36, and each character pattern is composed of seven conductor segments like 26a, 26b, 26c, 26e, 26f, and 26g. Each similarly-situated conductor segment (like 26b, 36b) of the character patterns is connected to a common terminal like 38. The substrates 12 and 14 are offset relative to each other to enable the common terminals like 38 to be exposed for connection to a conventional energizing circuit (not shown).

Each character pattern like 26 has its own common conductor element like 26h (FIG. 1) associated therewith. The conductor element 26h is deposited on the inside surface of the front substrate 12 and extends to cover all the bar-like conductor segments like 26a, b, c, etc., of its associated character pattern. The common conductor element 26h terminates at one end in a terminal 26i, where the front substrate 12 extends beyond the rear substrate 14 to expose the terminals like 26i and 36i for connection to said energizing circuit. The panel 10 has cavities which conform in shape to their corresponding segment electrodes like 26a, b, c, etc., and are aligned therewith. The outer edges of the panel 10 have a layer of glass like 40 and 42 therearound to conventionally seal the panel. After sealing, the panel is evacuated of air via the tube 20 and is then filled with an ionizable gas.

The method of forming the cavities in the panel 10 is best described in connection with FIG. 3, which shows a cross-sectional view of one of the cavities of the panel.

Figure 3:
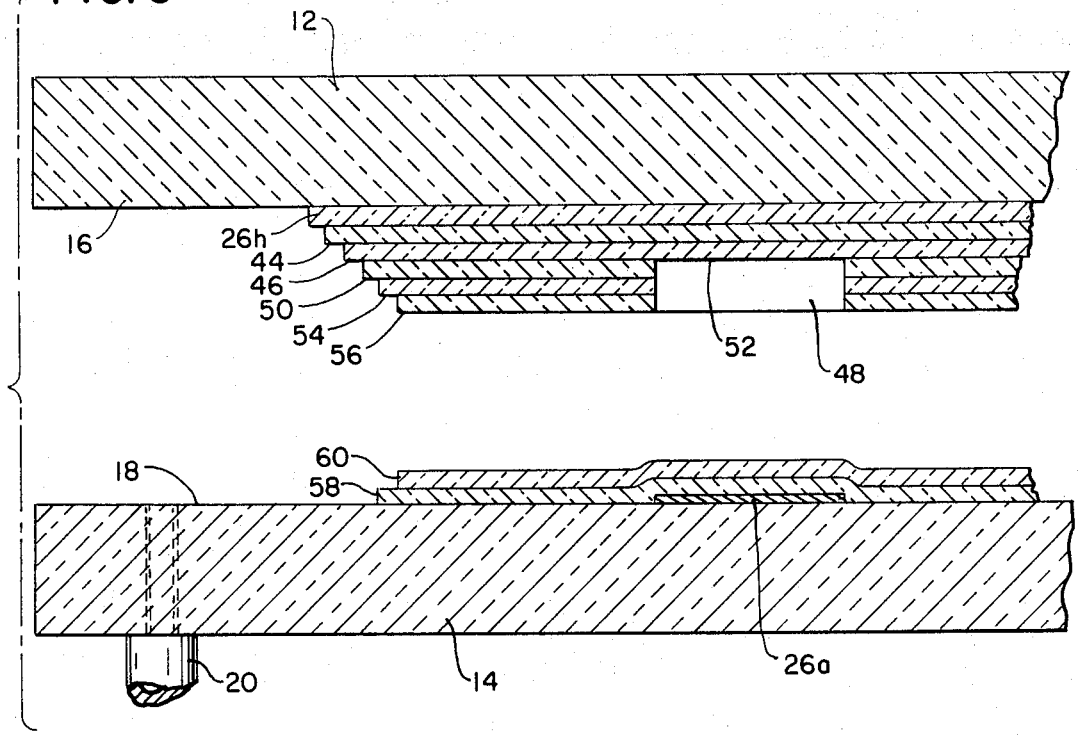
FIG. 3 is a cross-sectional view, taken along the line 3—3 of FIG. 1, with the front and rear substrates spaced apart to facilitate showing the method of forming the cavities.

Starting with the front substrate 12, a layer of tin oxide or other transparent conductor material is deposited thereon and conventionally etched to form the common electrodes like 26h (FIGS. 1 and 3). After these electrodes are formed, a first layer 44 of glass is deposited (by silk screening) over an area to cover the conductor pattern 24. This first layer 44 of glass has a high lead content (approximately 75%) and low silicon oxide content (about 4%), similar to glass No. 7570 manufactured by Corning Glass Company, United States of America. Upon the first layer 44 of glass, a second layer 46 of glass is deposited. This second layer 46 of glass has a relatively low lead content (approximately 30%) and a relatively high silicon oxide content (about 55%), similar to Corning's glass No. 0120 or a lead-free glass No. 0211. The substrate 12 with the layers 26h, 44, and 46 thereon is then fired in an oven at about 600 degrees centigrade for an hour and then slowly cooled to room temperature. The two layers 44 and 46 of glass generally fuse together and improve the operating life of the panel 10. The high-lead layer 44 provides a high dielectric constant, which is desirable; however, the use of this type of glass near the cavity appears to deteriorate the panel. Accordingly, the high silicon oxide layer 46 nearest the cavities was selected to shield the high-lead layer 44 from the cavity and thereby improve the operating life of the panel 10.

The cavities like 48 in FIG. 3 are formed in the following manner. A third layer 50 of glass is deposited (by silk screening) on the second layer 46, leaving an area (like 52 of the second layer 46) exposed where the cavity 48 is to be formed. The glass used for the layer 50 is an Owens-Illinois glass No. 00756, which is an opaque or dark glass. A fourth layer 54 and a fifth layer 56 of glass are deposited (by silk screening), leaving the area 52 exposed to thereby increase the depth of the cavity 48 to a predetermined amount. The layers 54 and 56 are identical in composition to the layer 50, and, generally, three to five layers of glass are used to form a cavity. The thickness of each layer of glass like 50 ranges between 0.001 to 0.002 inch, and the depth of the cavity 48 is customarily about 0.006 to 0.015 inch. Naturally, if the depth of a cavity is decreased, the pressure of the ionizable gas therein must be increased. Because these aspects are not important to this invention, any conventional depth of cavity and related gas pressure may be used.

After the layers 50, 54, and 56 are deposited on the substrate 12, the substrate is fired in an oven at a temperature of about 470 degrees centigrade for one hour and then cooled slowly to room temperature.

The rear substrate 14 (FIG. 3) has deposited thereon the conductor pattern 24 (shown in FIGS. 1 and 2), and in FIG. 3 only the segment electrode 26a is shown. As previously stated, a layer of conductor material, like silver, is deposited by conventional silk-screening techniques to produce the particular electrode pattern shown. A first layer 58 of glass is then deposited (by silk screening) over the electrode pattern 24, and a second layer 60 is similarly deposited over the first layer 58. The glasses in the layers 58 and 60 are identical to those in the layers 44 and 46 respectively. After deposition of the layers 58 and 60, the substrate 14 is fired in an oven at a temperature of 600 degrees centigrade for one hour and then cooled slowly. It should be noted that each cavity like 48 (FIG. 3) is aligned with a segment electrode like 26a when the two substrates 14 and 16 are assembled as shown in FIG. 1. It should also be noted that the layers 58 and 60 of glass correspond to the layers 44 and 46 respectively, and, accordingly, a cavity like 48 (FIG. 3) could also be formed on the substrate 14 instead of being formed on the substrate 12. As an alternate, cavities like 48 could be formed on each of the substrates 12 and 14 so that the combined depth of both cavities is equal to the desired depth of the cavity.

As an alternate method of producing cavities in the panel 10, a glass transfer tape may be used. A glass transfer tape is applied generally as one might apply an adhesive tape. The glass tape is flexible and is made from a glass powder and an organic binder. The binder (which appears to be proprietary to the Vitta Corporation, United States of America, the manufacturer of the tape) is probably a poly-n-butyl methacrylate which leaves as gaseous products, when the tape is fired in an oven. After firing, the glass powder solidifies as a glass with little or no organic binder remaining in the glass. The binder constitutes generally about 5% to 10% of the total weight of the tape. A variety of tapes of different glass compositions is commercially available from the Vitta Corporation.

Figure 4:
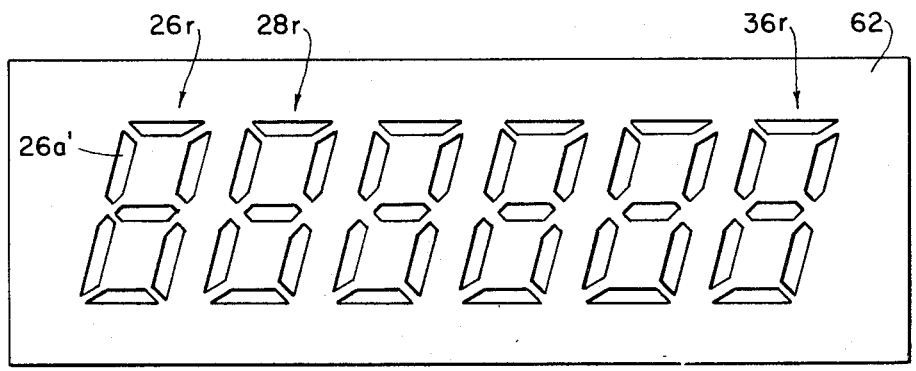
FIG. 4 is a plan view of a portion of a flexible glass transfer tape with the cavities cut therein.

The alternate method of producing cavities in a display panel can be explained using FIGS. 3 and 4. The layers 44 and 46 shown in FIG. 3 may be deposited by using two glass transfer tapes of the type described, or they may be silk screened, as already explained. When glass transfer tapes are used, a tape (Vitta No. G 1001) manufactured by the Vitta Corporation may be used for the layer 44, and a tape (Vitta No. G 1014) may be used for the layer 46. These glass tapes are about 0.002 inch thick and, after being fired in an oven at 600 degrees centigrade for a period of one hour, will produce a layer of glass approximately 0.0008 inch thick.

In order to form the cavities in the panel 10 using glass transfer tapes, the following procedure is used. A glass transfer tape 62, such as a Vitta Corporation tape No. G 1014, is shown in FIG. 4. The tape 62 appears to consist of about 75% lead oxide, 5% to 10% binder, and the remainder is zinc oxide. The tape 62 has therein a plurality of cut-outs, like 26r, 28r, 36r, corresponding to the electrode pattern 24 shown in FIG. 2. These cut-outs may be cut out by a knife or a punching operation. The tape 62, which is about 0.0065 inch thick and flexible, is applied to the layer 44 (FIG. 3) with the individual cut-outs, like 26a', aligned with their corresponding segment electrode (like 26a) to form the layer shown as 50 in FIG. 3. Another tape 62 is then applied in aligned relationship to the first-applied tape 62 to thereby increase the depth of the cavity (like 48 in FIG. 3) to a desired amount. After two such tapes 62 are applied to the layer 46, the substrate 12, with the tapes thereon, is fired as follows. The substrate 12 is first fired at 250 degrees centigrade for thirty minutes, and then the temperature is increased to 350 degrees centigrade for a period of approximately thirty minutes to eliminate gaseous material and organic products from the tapes. The substrate 12 is then fired at a temperature of 475 degrees centigrade for one hour, and thereafter it is allowed to cool slowly.

When each tape 62 is about 0.0065 inch thick, the resulting layer of glass has a thickness of about 0.004 inch after firing, so two such tapes 62 will produce a cavity 48 (FIG. 3) having a depth of 0.008 inch after firing. Naturally, the number of tapes 62 used will depend upon the depth of the cavity required and whether or not the cavity is to be formed on one of the substrates, like 12, or both substrates 12 and 14. In the embodiment shown, the tapes 62 produce an opaque glass to isolate the cavities (like 48) from one another. After the cavities are formed using the tapes 62, the two substrates 12 and 14 are conventionally assembled to produce the resulting display panel 10 shown in FIG. 1.

The cavities (like 48 in FIG. 1) are typically filled with a gas mixture of 99.7% neon, 0.1% argon, and 0.2% nitrogen to a pressure of 100 millimeters of mercury at room temperature with cavities having a depth of 0.008 inch. The individual cells are energized with an alternating voltage of 250 volts, with the pulses having a width of two microseconds. The characters are scanned at a frequency of 20 kHz. with satisfactory results. More details of the operation of the display panel 10 may be obtained from United States patent application Ser. No. 863,111, filed Oct. 2, 1969, by William E. Coleman and John L. Janning, which application is assigned to the assignee of the present application. An example of a control means for operating the display panel 10 may be found in United States patent application Ser. No. 847,141, now U.S. Pat. No. 3,614,769, filed Aug. 4, 1969, by William E. Coleman and Robert R. Skutt, which application also is assigned to the assignee of the present invention.

What is claimed is:

1. The method of forming gas containing cavities in a plasma display panel comprising the steps of:
    (a) depositing a first layer of glass on a substrate, omitting the layer from selected areas on the substrate to thereby form cavities at said areas;
    (b) depositing a second layer of glass on said first layer in registration therewith, omitting the second layer from said areas to thereby increase the depth of the cavities;

(c) repeating the depositing Step (b) until the desired depth of cavities is obtained; and (d) firing said substrate with said layers thereon to solidify said layers.

2. The method as claimed in claim 1 in which said depositing Steps (a), (b), and (c) are effected by silk-screening.

3. The method as claimed in claim 1 in which said depositing Steps (a), (b), and (c) are effected through using glass transfer tapes having holes therein in registration with said selected areas.

4. The method of forming a gas containing cavity in a plasma display panel comprising the steps of:

(a) depositing a layer of electrical conductor material on a first substrate;

(b) depositing on said layer of conductor material a first layer of glass having a high lead content but low silicon content;

(c) depositing on said first layer a second layer of glass having a high silicon content but low lead content;

(d) firing said substrate to bond said first and second layers together and to bond said first layer to said layer of conductor material;

(e) depositing a third layer of glass on the second layer of glass, leaving an area of said second layer exposed to form a cavity thereat;

(f) depositing successive layers of glass on said third layer and on one another, leaving said areas of said second layer exposed, thereby increasing the depth of said cavity to a predetermined dimension; and (g) firing said substrate to bond said third and successive layers to one another and to bond said third layer to said second layer.

5. The method as claimed in claim 4 in which said depositing Steps (e) and (f) are effected by silk-screening.

6. The method as claimed in claim 4 in which said depositing Steps (b), (c), (e), and (f) are effected by silk-screening.

7. The method as claimed in claim 4 in which said depositing Step (e) is effected by cutting a hole in a glass transfer tape and securing the tape to the second layer so that the hole therein is in registration with said area of the second layer.

8. The method as claimed in claim 7 in which said depositing Step (f) is effected by cutting holes in successive glass transfer tapes and securing the first of said successive tapes on said tape from Step (e) and the remainder of said successive tapes to one another, with said holes in the successive tapes being in registration with the hole in the tape from Step (e).

References Cited
UNITED STATES PATENTS

| | | | |
|---|---|---|---|
| 3,573,531 | 4/1971 | Kerstetter et al. | 313—220 U |
| 3,588,571 | 6/1971 | Yanagisawa | 313—109.5 |
| 3,509,407 | 4/1970 | Cullis, Jr. | 313—201 |
| 3,334,269 | 8/1971 | L'Heureux | 315—58 |

DANIEL J. FRITSCH, Primary Examiner

U.S. Cl. X.R.

117—70 A, 70 C, 212, 215; 156—101, 263; 313—109.5, 201; 316—17, 20